(12) United States Patent
Chennakeshu

(10) Patent No.: US 10,142,819 B2
(45) Date of Patent: Nov. 27, 2018

(54) ESTABLISHING MACHINE TYPE COMMUNICATIONS

(71) Applicant: BlackBerry Limited, Waterloo (CA)

(72) Inventor: Sandeep Chennakeshu, Austin, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 4 days.

(21) Appl. No.: 14/812,796

(22) Filed: Jul. 29, 2015

(65) Prior Publication Data

US 2017/0034644 A1   Feb. 2, 2017

(51) Int. Cl.
| | |
|---|---|
| H04W 4/00 | (2018.01) |
| H04W 12/06 | (2009.01) |
| H04W 60/04 | (2009.01) |
| H04W 76/02 | (2009.01) |
| H04W 4/70 | (2018.01) |
| H04W 76/14 | (2018.01) |
| H04W 12/04 | (2009.01) |
| H04W 84/12 | (2009.01) |
| H04W 8/20 | (2009.01) |

(52) U.S. Cl.
CPC ............. *H04W 4/70* (2018.02); *H04W 12/04* (2013.01); *H04W 12/06* (2013.01); *H04W 60/04* (2013.01); *H04W 76/14* (2018.02); *H04W 8/205* (2013.01); *H04W 84/12* (2013.01)

(58) Field of Classification Search
CPC ..... H04W 4/005; H04W 12/06; H04W 60/04; H04W 76/023; H04W 84/12; H04W 68/00–68/12

USPC ................... 455/410, 411, 435, 435.1, 458; 713/168–172
See application file for complete search history.

(56) References Cited

U.S. PATENT DOCUMENTS

| | | | | |
|---|---|---|---|---|
| 2012/0252445 | A1* | 10/2012 | Lindholm | H04W 8/26 455/433 |
| 2013/0028411 | A1* | 1/2013 | Arkko | H04L 9/0833 380/28 |
| 2013/0070710 | A1* | 3/2013 | Guo | H04W 4/005 370/329 |
| 2013/0136072 | A1* | 5/2013 | Bachmann | H04W 4/00 370/329 |
| 2013/0155948 | A1* | 6/2013 | Pinheiro | H04W 76/10 370/328 |
| 2013/0291071 | A1* | 10/2013 | Blom | H04L 9/0833 726/4 |

(Continued)

FOREIGN PATENT DOCUMENTS

WO    2011/115407    9/2011

OTHER PUBLICATIONS

International Search Report and Written Opinion of the International Searching Authority issued in International Application No. PCT/US2016/044668 dated Oct. 13, 2016; 17 pages.

*Primary Examiner* — Kamran Afshar
*Assistant Examiner* — Nicole Louis-Fils
(74) *Attorney, Agent, or Firm* — Fish & Richardson P.C.

(57) ABSTRACT

A method for establishing a machine type communication includes receiving a connection request for a machine type communication from a device. The connection request includes an authentication credential for the device. A shared subscriber identity module (SIM) parameter for the machine type communication is obtained based on the authentication credential.

17 Claims, 4 Drawing Sheets

(56) References Cited

U.S. PATENT DOCUMENTS

| | | | |
|---|---|---|---|
| 2013/0305330 A1 | 11/2013 | Palanigounder | |
| 2014/0073289 A1 | 3/2014 | Velasco | |
| 2014/0126460 A1* | 5/2014 | Bienas | H04W 74/002 370/315 |
| 2014/0226562 A1* | 8/2014 | Shah | H04W 76/045 370/328 |
| 2014/0351592 A1* | 11/2014 | Starsinic | H04L 63/0876 713/168 |
| 2015/0012744 A1* | 1/2015 | Chen | H04W 12/04 713/155 |
| 2015/0281961 A1* | 10/2015 | Lee | H04W 12/04 455/411 |
| 2015/0312758 A1* | 10/2015 | Redford | H04W 4/001 455/410 |
| 2016/0021691 A1* | 1/2016 | Lee | H04W 60/04 455/435.1 |

* cited by examiner

ESTABLISHING MACHINE TYPE COMMUNICATIONS

TECHNICAL FIELD

This disclosure relates to data transmission in communication systems and, more specifically, to establishing machine type communications.

BACKGROUND

In an Internet of Things (IoT) environment, machines can be connected with other machines or data collection points. In some cases, these machines can be monitored and the operation data of these machines can be collected and analyzed. This data can be transmitted in a machine type communication. As more and more devices are connected, machine type communication has expanded rapidly and may have a significant impact on the operation of communication networks.

DESCRIPTION OF DRAWINGS

Like reference numbers and designations in the various drawings indicate like elements.

DETAILED DESCRIPTION

The present disclosure is directed to establishing a machine type communication. In a machine type communication, equipment and devices may generate data based on one or more attributes that need to be monitored. This data may be sensed, collected, and transmitted to a collection point, where the data may be further analyzed. For example, a smart meter may sense the energy usage of a residence and provide the data to a utility company. The utility company may analyze the data in managing power, dimensioning the power, and delivering the power to homes in different neighborhoods of the city.

In some cases, the machine type communication data can be transmitted using one of several local area network or wide area network technologies. However, these technologies may not provide a low cost and efficient access solution for wide area coverage. For example, Zigbee, WiFi, and Bluetooth are local area networks that may transmit over a short distance. Cable or Internet modems are available indoors in buildings, but may not be able to provide a ubiquitous coverage over a wide area, such as outdoors. Cellular technology provides wide-area coverage, but may be expensive, particularly when factoring in the cost of a cellular modem, which may include a communication module with second generation (2G), third generation (3G), and fourth generation (4G) capabilities, in addition to the cost of a subscription for a regular data channel data over a cellular network. Even a low data monitoring system, such as an alarm monitoring system, may have a retail price of $5/month. Therefore, using current cellular technology to provide machine type communication (MTC) may be costly for several applications.

In some implementations, a low-cost machine type communication may be established. A MTC device may obtain a shared access manifest parameter. The MTC device may establish a communication channel using the shared access manifest parameter. The MTC device may transmit a MTC data packet using the communication channel. After the transmission, the shared access manifest parameter may be reused by a different MTC device for a different machine type communication.

Figure 1:
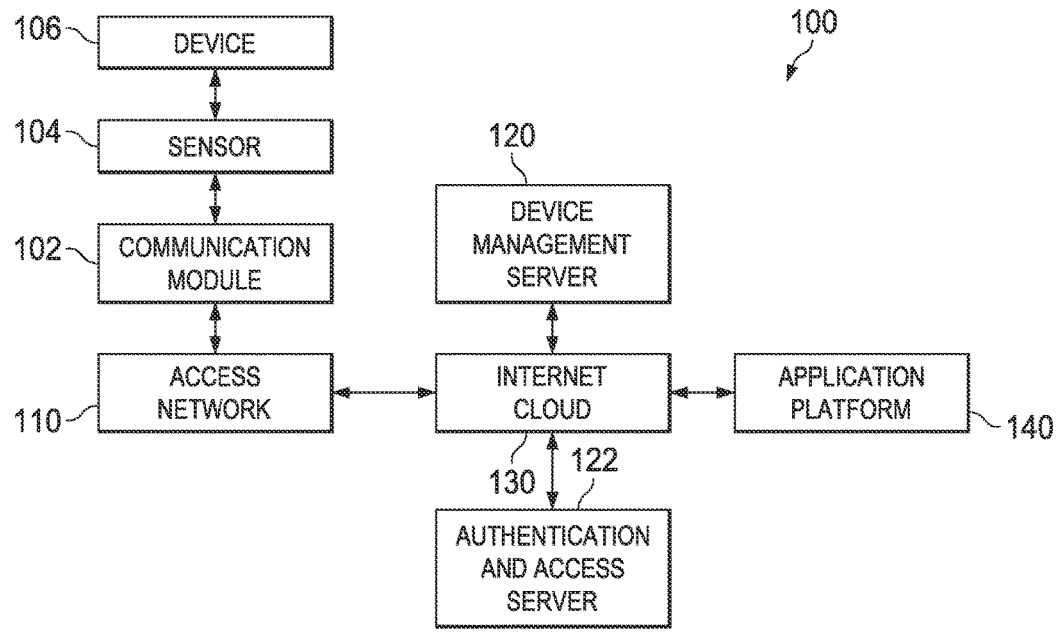
FIG. 1 is an example communication system that establishes a machine type communication.

FIG. 1 is an example communication system 100 that establishes a machine type communication. For example, a connection request for a machine type communication may be received from a MTC device. The connection request may include an authentication credential for the MTC device. In some implementations, the MTC device may be enabled with Long Term Evolution (LTE) communication capability that is configured for the machine type communication. A shared subscriber identity module (SIM) parameter for the machine type communication may be obtained based on the authentication credential. In some implementations, obtaining the SIM parameter may include sending the authentication credential to a device management server and receiving the shared SIM parameter in response to the authentication credential.

In some implementations, the shared SIM parameter may be transmitted to the MTC device. In some implementations, the shared SIM parameter may be encrypted by a public key of the MTC device. In some implementations, a registration request may be received from the MTC device. The registration request may include the shared SIM parameter. The MTC device may be registered with a cellular network using the shared SIM parameter. A data packet may be received from the MTC device for the machine type communication. In some implementations, a deregistration indication may be received from the MTC device. In response to the deregistration indication, a release message may be sent. The release message may release the shared SIM parameter. In some implementations, a machine type communication channel for the MTC device may be established using the shared SIM parameter independent of sending the shared SIM parameter to the MTC device.

Establishing a machine type communication according to methods and systems described herein may provide one or more advantages. For example, by using a shared SIM parameter among multiple devices, the cost of providing access for the machine type communication can be significantly reduced. Furthermore, a MTC device that is configured for a machine type communication may include a reduced set of circuit components and support a simplified communication protocol. Therefore, the cost of making such MTC device can also be reduced. Furthermore, using an authentication and Access server (AAS) to authenticate a MTC device and encrypt a shared SIM parameter may increase the security of machine type communication. Other advantages will be apparent to those of ordinary skill in the art.

At a high level, the example communication system 100 includes a device 106 that is coupled to a sensor 104. The sensor 104 is communicatively coupled to a communication module (CM) 102. The example communication system 100 also includes a device management server (DMS) 120 that is configured to communicate with an access network (AN) 110, an Authentication and Access Sever (AAS) 122, and an application platform 140. The communication may occur in any appropriate manner, such as over an Internet cloud 130. The AN 110 is also configured to communicate with the CM 102.

As illustrated, the example communication system 100 includes the device 106 that is coupled to the sensor 104. The device 106 represents a device that is configured to generate data for monitoring. Examples of the device 106 includes white goods, consumer electronics, factory automation, transport vehicles, assets such as containers and fleet vans, retail goods, etc. The sensor 104 represents hardware, software, applications or a combination thereof that can be used to sense data associated with the device 106, or the environment in which the device 106 is located.

In one example, the device 106 represents an electricity meter that records energy usage. In some cases, the sensor 104 can include a data converter and a microprocessor. The microprocessor can be configured to continuously monitor the device 106 and receive recorded energy usage. The data converter can convert analog information from the device 106 to digital data that the microprocessor can process. The sensor 104 can send data sensed to the CM 102 for transmission. In some cases, the sensor 104 can be embedded in the device 106. In some cases, the device 106 may embed the sensor and an explicit sensor 104 can be omitted, and vice versa. In another example, the device 106 is an automobile. The sensor 104 is configured to monitor vehicle data, such as engine data in the automobile, and send the data to the CM 102. The engine data can be analyzed to understand driving patterns and fuel consumption. Another example of a sensor in an automobile is an accelerometer, which can be used to sense motion and report whether the automobile is moving or stationary.

The example communication system 100 includes the CM 102. The CM 102 represents an application, set of applications, software, software modules, hardware, or combination thereof that can be configured to communicate with the AN 110 for a machine type communication. The CM 102 receives data from the sensor 104 or the device 106 and transmits the data to the AN 110. In some cases, the CM 102 can be a MTC device. In a general description, the term "MTC device" can also refer to any hardware and/or software component that can initiate and/or terminate a communication session.

In some cases, the CM 102 can include a wireless modem or a wireline modem Examples of a wireline modem include a modem that is configured to transmit or receive data over a Digital subscriber line (DSL), an optical cable, a coaxial cable, or any other wireline access technology. Examples of a wireless modem include a Wi-Fi modem, a Zigbee modem, a satellite modem, or a cellular modem. Examples of a cellular modem include a modem that can be configured to transmit and receive data using Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or any other radio access technology.

In some cases, a cellular modem may include circuit components, memory storage units, and software for multiple radio access technologies, radio frequency components covering radio frequency bands, and other peripheral interfaces. In some cases, the CM 102 can be implemented as a low-cost cellular modem that is configured for machine type communication. For example, the CM 102 may include a LTE modem with reduced functionality. In some cases, the LTE technology may offer a broad coverage across the globe. LTE technology may also provide higher data rate at a lower cost. LTE technology is also suitable for the transmission of bursty data and, therefore, provides an efficient way for multiple devices to share access to the AN 110. In some cases, the CM 102 may include an LTE MTC device (UE).

In some cases, the CM 102 may be configured to support a single radio access technology. For example, the CM 102 may be configured to support LTE as the only radio access technology. The CM 102 may also be configured to support only a limited set of radio frequency bands and a reduced protocol stack for a fixed device, e.g., without supporting the inter radio access transport handover. An example on inter radio access transport handover is the handover from a third generation (3G) to a fourth generation (4G) radio transport. With the reduced radio frequency bands, elimination of the second generation (2G) and the third generation (3G) circuits, limited peripherals and I/O circuits, reduction of software and memory requirements, the cost of CM 102 can be significantly reduced.

In some cases, the CM 102 can be configured to store, buffer, mark, or tag the data received from the sensor 104 or the device 106. In some cases, the CM 102 can also encrypt the data and communicate the data with the AN 110. FIGS. 2-6 and associated descriptions provide additional details of certain implementations.

The example communication system 100 also includes the AN 110. The AN 110 represents an application, set of applications, software, software modules, hardware, or combination thereof that can be configured to communicate with the CM 102 over an access interface and further communicate with other elements of the example communication system 100 over the Internet. The AN 110 can also be configured to communicate with the CM 102 over a wireline access technology, e.g., Digital subscriber line (DSL), optical cable, a coaxial cable, or a wireline local area network (LAN). The AN 110 can also be configured to communicate with the CM 102 over a wireless access technology, e.g., Wi-Fi, Zigbee, Bluetooth, personal area network (PAN), or any of the cellular access technology discussed above. In one example, the AN 110 can be an LTE network that includes one or more e-Node Bs (eNBs) and Evolved Packet Cores (EPCs). In another example, the AN 110 can be a Wi-Fi access point.

In some cases, the AN 110 can be a network that is operated by a mobile virtual network operator (MVNO). Alternately or in combination, the AN 110 can be operated by a traditional Cellular Operator. In some cases, the initial access procedure for a network that is operated by the traditional Cellular Operator may be modified for establishing a machine type communication.

As illustrated, the example communication system 100 also includes the DMS 120. The DMS 120 represents an application, set of applications, software, software modules, hardware, or combination thereof that can be configured to communicate with the CM 102 over the Internet cloud 130 to control the machine type communication. For example, the DMS 120 can be configured to command the CM 102 to wake up, collect data, send the data to the DMS 120, and go to sleep.

The example communication system 100 also includes the application platform 140. The application platform 140 represents an application, set of applications, software, software modules, hardware, or combination thereof that can be configured to process the data transmitted by the CM 102. In some cases, the application platform 140 can be implemented on a server that is communicatively coupled with the DMS 120. Alternatively or in combination, the application platform 140 can be implemented on the same platform as the DMS 120. In some cases, the application platform 140 can be configured to receive, sort, classify, and analyze data. In some cases, the application platform 140 can be configured to create bills and reports. In some cases, the application platform 140 can support one or more vertical businesses, e.g., Health care, Retail, Automotive, Asset Tracking, Fleet Management, Metering, etc. Each of the vertical business can be supported by an application running on the application platform 140.

The example communication system 100 includes the AAS 122. The AAS 122 represents an application, set of applications, software, software modules, hardware, or combination thereof that can be configured to authenticate the CM 102 and to provide an access manifest parameter for the establishment of a machine type communication channel. In some cases, the AAS 122 can authenticate the CM 102 using a device identity of the CM 102. FIGS. 2-6 and associated descriptions provide additional details of certain implementations.

In operation, the AN 110 receives a connection request for a machine type communication from the CM 102. The connection request includes an authentication credential for the CM 102. The AN 110 obtains a shared subscriber identity module (SIM) parameter for the machine type communication based on the authentication credential. In some cases, the AN 110 transmits the shared SIM parameter to the CM 102. The AN 110 receives a registration request from the CM 102. The registration request may include the shared SIM parameter. The AN 110 registers the CM 102 using the shared SIM parameter. The AN 110 receives a data packet for the machine type communication from the CM 102. The AN 110 transmits the data to the DMS 120 and the DMS 120 forwards the data to the application platform 140. In some cases, the AN 110 may transmit the data to the application platform 140 directly. FIGS. 2-6 and associated descriptions provide additional details of both Uplink (UL) and Downlink (DL) transmissions.

While elements of FIG. 1 are shown as including various component parts, portions, or modules that implement the various features and functionalities, nevertheless these elements may instead include a number of sub-modules, third-party services, components, libraries, and such, as appropriate. Furthermore, the features and functionality of various components can be combined into fewer components as appropriate.

Figure 2:
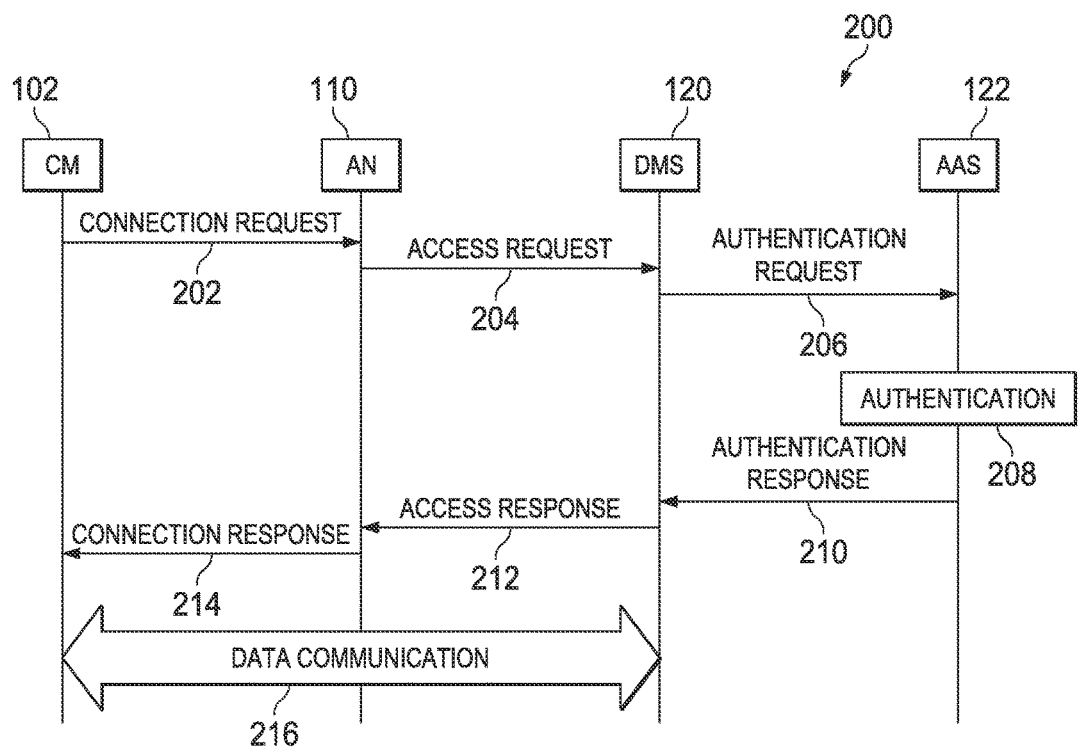
FIG. 2 is a message flow diagram illustrating an example process for establishing a machine type communication.

FIG. 2 is a message flow diagram 200 illustrating an example process for establishing a machine type communication. The message flow diagram 200 includes the CM 102, the AN 110, the DMS 120, and the AAS 122. In the illustrated example, the CM 102 is communicatively coupled with a sensor that collects monitoring data. For example, the CM 102 can be communicatively coupled with a smart meter that monitors the energy usage of a residence and collects data for the energy usage. In some cases, the smart meter can send the monitored data to the CM 102. In some cases, the data can be sent over a serial link, a parallel link, or a USB link. For example, a low power link, e.g., a Transaction Layer Packet (TLP)/USB 2.0 Transceiver Macrocell Interface (UTMI) Low Pin Interface (ULPI) link or an Inter-IC (I2C) link, can be used as the communication link between the smart meter and the CM 102. In some cases, the CM 102 can package the data for a machine type communication. For example, the CM 102 can include a time stamp that specifies a date, a time of collection, or both. The CM 102 can also include other related data, e.g., the location of the meter, the meter identity, the house identity, the temperature, or any combination thereof. In addition, the CM 102 can encrypt the machine type communication data package for security.

At 202, the CM 102 initiates an attach procedure with the AN 110. In some cases, the CM 102 can begin the attach procedure by sending a connection request to the AN 110. The connection request can include an authentication credential for the CM 102. The authentication credential can include an identity of the CM 102. Examples of the identity includes an International Mobile Subscriber Identity (IMSI), a System Architecture Evolution (SAE) Temporary Mobile Subscriber Identity (S-TMSI), any other electronic equipment identifiers, or a combination thereof. In some cases, the S-TMSI can include a Mobility Management Entity (MME) Temporary Mobile Subscriber Identity (M-TMSI) and an MME Code (MMEC). In some cases, the connection request can also include an indication that the connection is for a machine type communication.

At 204, the AN 110 sends an access request to the DMS 120. The access request can indicate that an access for a machine type communication is requested. In some cases, the access request can include the authentication credential, e.g., the identity of the CM 102, in the connection request that is received by the AN 110.

At 206, the DMS 120 sends an authentication request to the AAS 122. In some cases, the authentication request can include the authentication credential of the CM 102. At 208, the AAS 122 authenticates the CM 102 using the authentication credential. In some cases, the AAS 122 can use an Elliptic Curve Cryptography (ECC) certificate-based authentication procedure to perform the authentication procedures. An example of such an authentication procedure includes using TLS (transport layer security) protocol using ECC certificates/signatures. In some cases, the authentication credential may include a key, a certificate, a secret, a signature, or a combination thereof that is used in the authentication procedure. In some cases, the CM 102 may send a key, a certificate, a secret, a signature, or a combination thereof in addition to the authentication credential. During the authentication procedures, the AAS 122 can validate the CM 102 as an authorized device for a machine type communication. The AAS 122 can also verify that the CM 102 has an up-to-date subscription for the machine type communication based on a stored profile of the CM 102.

At 210, the AAS 122 sends an authentication response to the DMS 120. The authentication response indicates whether the authentication is successful. If the authentication is not successful, the DMS 120 can send an access response to the AN 110, and the AN 110 can terminate the attach procedure of the CM 102.

If the authentication is successful, the AAS 122 can include one or more access manifest parameters in the authentication response message. The access manifest parameters include parameters to establish a communication channel between the CM 102 and the DMS 120. In one example, the access manifest parameters can include one or more subscriber identity module (SIM) parameters. The one or more SIM parameters can be used to establish a connection over a cellular network. In another example, the access manifest parameters can include a key or other unique identifier. The key can be used to establish a connection over, e.g., a WiFi or a Zigbee network. In some cases, the AAS 122 can have access to a pool of access manifest parameters and select an unoccupied access manifest parameter from the pool. For example, the AAS 122 can have access to a pool of shared SIM parameters. The AAS 122 can select a shared SIM parameter among the pool of shared SIM parameters that are currently not used by another communication module (CM), and include the selected shared SIM parameter in the authentication response.

In some cases, the AAS 122 can encrypt the access manifest parameters and include the encrypted access manifest parameters in the authentication response. For example, the AAS 122 can use the public key of the CM 102 to encrypt the access manifest parameters.

At 212, the DMS 120 sends an access response to the AN 110. As discussed previously, if the authentication is not successful, the access response may indicate a rejection of the access request. If the authentication is successful, the access response can include the access manifest parameters that the DMS 120 receives from the AAS 122.

In some implementations, instead of sending the access manifest parameters to the DMS 120 so that the DMS 120 can forward the access manifest parameters to the AN 110, the AAS 122 can send the access manifest parameters directly to the AN 110.

At 214, the AN 110 sends a connection response to the CM 102. The connection response includes the access manifest parameters for the CM 102. In some cases, as discussed previously, the access manifest parameters can be encrypted. In these or other cases, the CM 102 can decrypt the access manifest parameters.

At 216, the CM 102 establishes a communication channel with the DMS 120 using the access manifest parameters. In some cases, the AN 110 can be the access network that provides the communication channel. In one example, the AN 110 is a cellular network, e.g., an LTE network. The CM 102 can send a registration request to the AN 110. The registration request can include the access manifest parameters, e.g., a shared SIM parameter, that the CM 102 receives at 214. The AN 110 can use the access manifest parameters to register the CM 102 with the access network. Upon a successful registration, the AN 110 can establish a communication channel for the CM 102. The CM 102 can send the data package of the machine type communication over the communication channel to the AN 110 and further to the DMS 120.

Alternatively, the CM 102 can use an access network that is different than the AN 110 to establish a communication channel with the DMS 120. In one example, the AN 110 is a Wi-Fi network, and the CM 102 uses the AN 110 to receive the access manifest parameters, e.g., a shared SIM parameter. The CM 102 can use the shared SIM parameter to register with an LTE network and transmit the machine type communication data package to the DMS 120 using an LTE network. In another example, the AN 110 is a cellular network, and the CM 102 uses the AN 110 to receive a shared token or a shared key. The CM 102 can use the shared token or the shared key to register with a Wi-Fi or a Zigbee network and transmit the machine type communication data package to the DMS 120 using the Wi-Fi or the Zigbee network.

In some cases, after the CM 102 completes the transmission of the machine type communication data package, the CM 102 can send a deregistration indication to the AN 110, delete the access manifest parameters, and go to sleep. In response to the deregistration indication, the AN 110 can send a release message to the AAS 122. Alternatively or in combination, the DMS 120 can send a release message to the AAS 122 after the DMS 120 has received the machine type communication data package from the CM 102. The release message may include the access manifest parameters, the identity of the CM 102, or a combination thereof. The release message indicates that the access manifest parameters, e.g., the shared SIM parameter, can be released and used for other communication modules (CMs). Therefore, the access manifest parameters can be reused when another communication module (CM) requests a connection for a machine type communication.

In some cases, the AAS 122 can manage the pool of shared access manifest parameters independent of the release message. For example, the AAS 122 may set a timer for each shared access manifest parameter that is assigned to a communication module (CM). The timer may be set according to an estimated time that may be used for the transmission of a machine type communication data packet. When the timer expires, the AAS 122 can determine that the assigned shared manifest parameter can be reused for another communication module (CM).

By sharing access manifest parameters among multiple communication modules at different times, the cost for providing communication channels for machine type communication can be reduced. For example, assuming that 3 GB of data per month can be shared among 1000 devices, each device can transmit 3 MB of data per month. This is equivalent to transmitting 100 KB of data per day from each device. Further assuming that the cost of 3 GB/month channel is around $20 for wholesale purchase, the cost of service per device can theoretically be $20/1000=$0.02/device/month. Therefore, this approach significantly reduces the cost of transmitting machine type communication data across a wide area of coverage. Alternately it may allow an enterprise to more fully utilize the data they buy by sharing the data usage between devices, but generally not at the same time.

Figure 3:
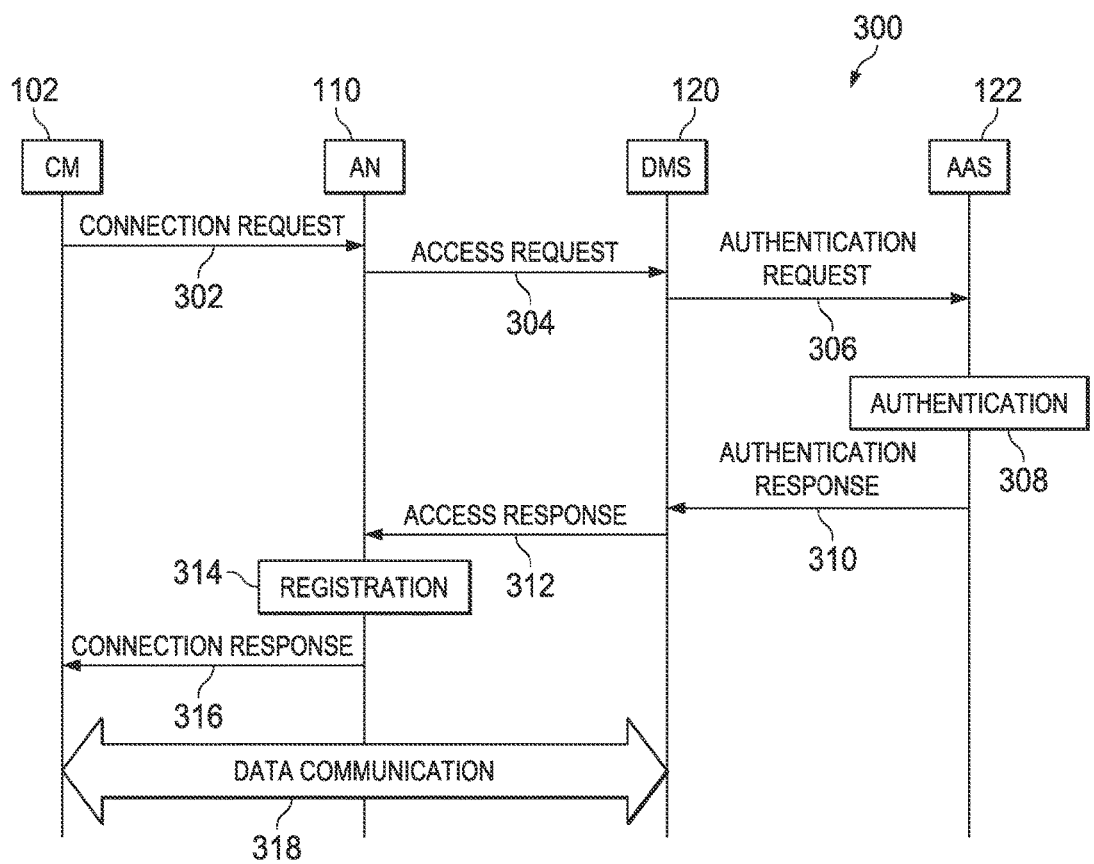
FIG. 3 is a message flow diagram illustrating another example process for establishing a machine type communication.

In some cases, the AN 110 can establish a communication channel for the CM 102 without sending the access manifest parameters to the CM 102. FIG. 3 is a message flow diagram 300 illustrating another example process for establishing a machine type communication. The message flow diagram 300 includes the CM 102, the AN 110, the DMS 120, and the AAS 122. As discussed previously, the CM 102 is communicatively coupled with a sensor. The CM 102 receives monitored data from the sensor and packages the data for a machine type communication.

At 302, the CM 102 initiates an attach procedure with the AN 110. As discussed previously, the CM 102 can begin the attach procedure by sending a connection request to the AN 110. The connection request can include an authentication credential for the CM 102. At 304, the AN 110 sends an access request to the DMS 120. In some cases, the access request can include the authentication credential. At 306, the DMS 120 sends an authentication request to the AAS 122. In some cases, the authentication request can include the authentication credential of the CM 102. At 308, the AAS 122 authenticates the CM 102 using the authentication credential. At 310, the AAS 122 sends an authentication response to the DMS 120. As discussed previously, the authentication response can include one or more access manifest parameters that can be used to establish a communication channel between the CM 102 and the DMS 120. At 312, the DMS 120 sends an access response to the AN 110. The access response can include the access manifest parameters.

In some cases, at 314, the AN 110 uses the access manifest parameters to establish the communication channel for the CM 102 without sending the access manifest parameters to the CM 102. The AN 110 can register the CM 102 using the access manifest parameters it receives and establish a communication channel for the CM 102 once the registration is successful. At 316, the AN 110 can send a connection response to the CM 102. The connection request indicates to the CM 102 that the communication channel has been established. At 318, the CM 102 can send the data package of the machine type communication over the communication channel to the DMS 120.

Storing the access manifest parameters in the AN 110 may provide one or more advantages. For example, this approach may prevent a rogue communication module (CM) from continuing to use the access manifest parameters after sending the machine type communication data packet.

Figure 4:
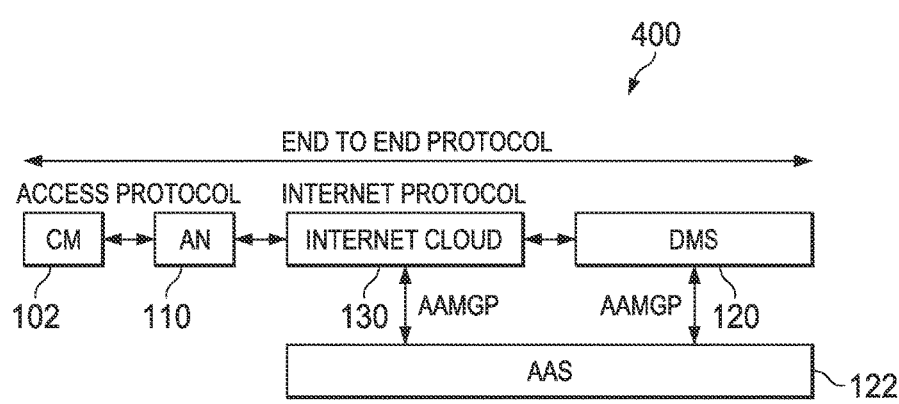
FIG. 4 is a diagram illustrating an example layered protocol structure for establishing a machine type communication.

FIG. 4 is a diagram illustrating an example layered protocol structure 400 for establishing a machine type communication. The structure 400 includes the CM 102, the AN 110, the DMS 120, the AAS 122, and the Internet cloud 130. As illustrated, the CM 102 communicates with the AN 110 using a low-layer access protocol. In some cases, the low-layer access protocol is based on the access technology used by the AN 110. In one example, the AN 110 is a LTE network and the access protocol is therefore the LTE access protocol. In another example, the AN 110 is a Wi-Fi network and the access protocol is therefore the Wi-Fi protocol. The AN 110 communicates with the DMS 120 over the Internet cloud 130 using a high-layer protocol, e.g., an Internet protocol. In some cases, the CM 102 can communicate with the DMS 120 using a low-overhead protocol, e.g., a constrained command Session Initiation Protocol (SIP)-like protocol or Constrained Application Protocol (CoAP). In this case the payload is encapsulated with the low overhead protocol, which in turn is encapsulated within the LTE access protocol. The LTE access protocol terminates in AN 110 and AN 110 then sends the payload encapsulated with the low overhead protocol to the DMS 120. DMS 120 will have a proxy that can extract the payload from the low overhead protocol and send it in the appropriate format for processing by the DMS 120. In some cases the CM 102 can encapsulate the payload information in a higher-level protocol like a TCP/IP packet, which is encapsulated within the LTE protocol. As described above the LTE protocol will terminate at AN 110 and AN 110 will then send the payload encapsulated with the higher-level protocol to the DMS 120. The DMS 120 will have a proxy that can extract the payload from the low overhead protocol and send it in the appropriate format for processing by the DMS 120.

In some cases, the DMS 120 can communicate with the AAS 122 using a propriety protocol. An Authentication and Access Manifest Grant Protocol (AAMGP) can be configured to transmit authentication requests and responses discussed previously. In some cases, as discussed previously, the AN 110 may communicate with the AAS 122 directly, e.g., to receive the access manifest parameters. In these or other cases, the AAS 122 can package the access manifest parameters in the AAMGP, and then further encapsulate the package in an Internet protocol and transmit to the AN 110 over the Internet cloud 130.

Figure 5:
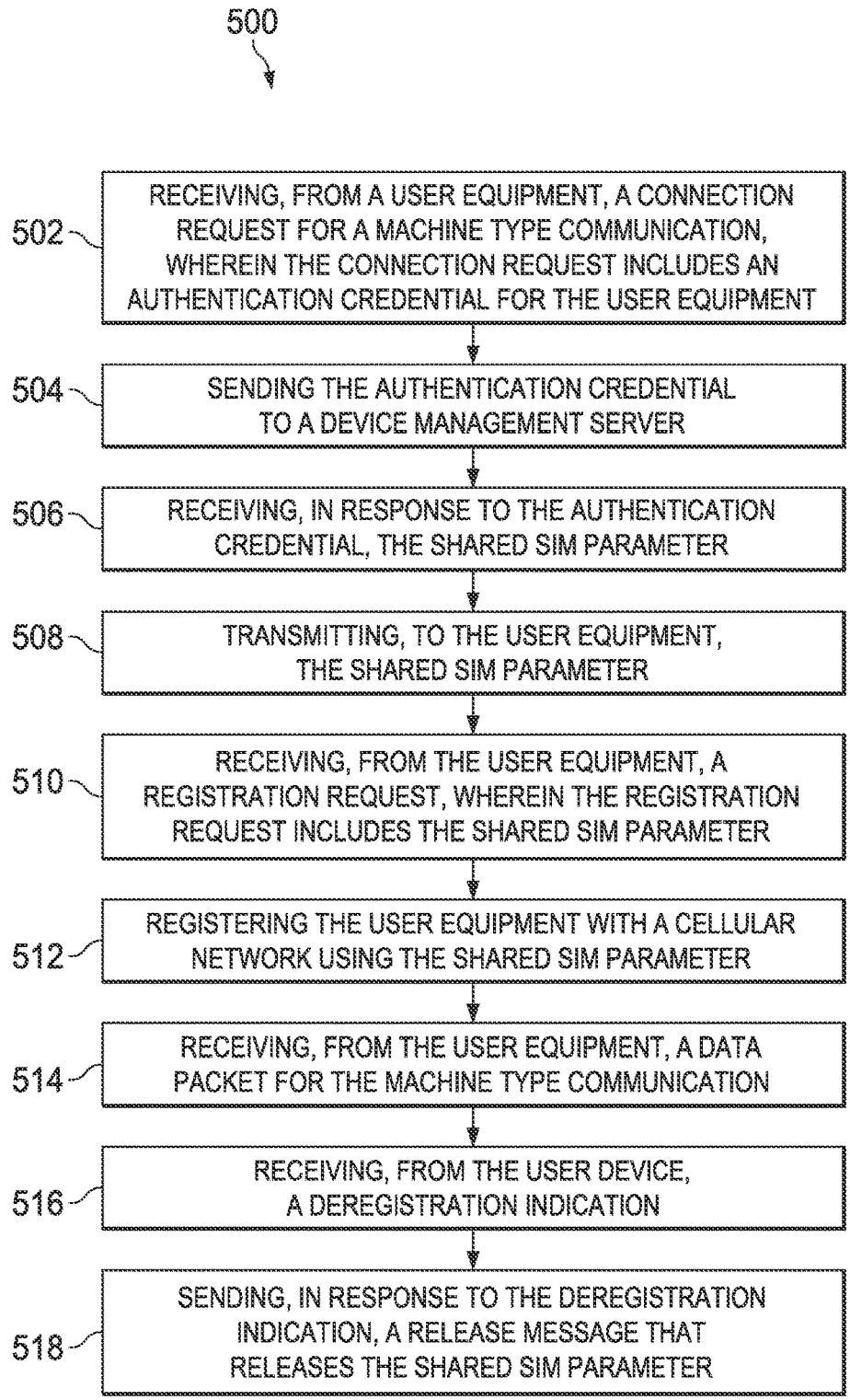
FIG. 5 is a flowchart illustrating an example method for establishing a machine type communication.

FIG. 5 is a flowchart illustrating an example method 500 for establishing a machine type communication. The method 500 may begin at block 502, where a connection request for a machine type communication is received from a MTC device. The connection request includes an authentication credential for the MTC device. In some implementations, the MTC device may be a Long Term Evolution (LTE) MTC device that is configured for the machine type communication. At block 504, the authentication credential is sent to a device management server (DMS). At block 506, a shared SIM parameter is received in response to the authentication credential.

At block 508, the shared SIM parameter is transmitted to the MTC device. In some implementations, the shared SIM parameter may be encrypted by a public key of the MTC device. In some implementations, a machine type communication channel for the MTC device may be established using the shared SIM parameter independent of sending the shared SIM parameter to the MTC device.

At block 510, a registration request is received from the MTC device. The registration request includes the shared SIM parameter. At block 512, the MTC device is registered with a cellular network using the shared SIM parameter. At block 514, a data packet is received from the MTC device for the machine type communication. At block 516, a deregistration indication is received from the MTC device. At block 518, in response to the deregistration indication, a release message is sent. The release message releases the shared SIM parameter.

Figure 6:
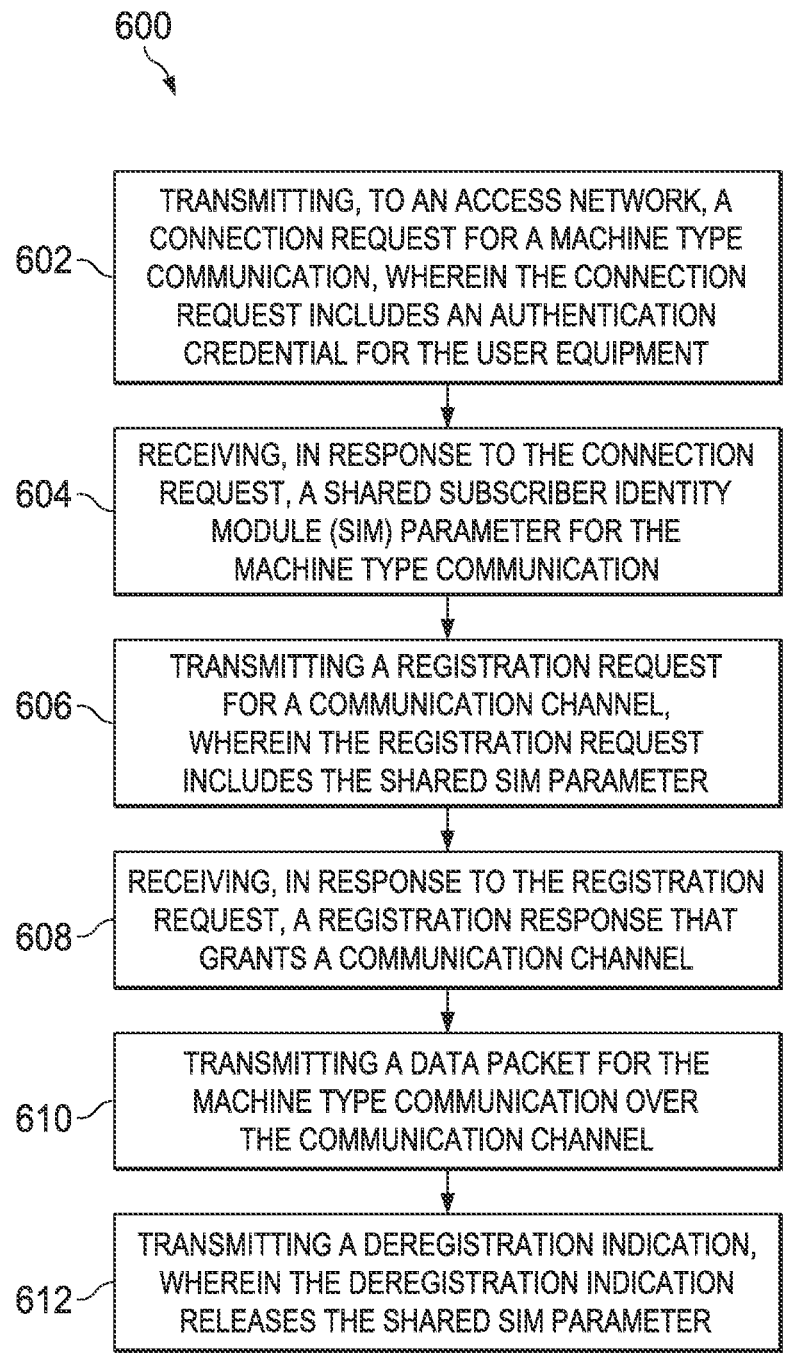
FIG. 6 is a flowchart illustrating another example method for establishing a machine type communication.

FIG. 6 is a flowchart illustrating another example method 600 for establishing a machine type communication. The method 600 may begin at block 602, where a connection request for a machine type communication is transmitted to an access network. The connection request includes an authentication credential for the MTC device. In some implementations, the connection request is transmitted at a Long Term Evolution (LTE) MTC device that is configured for the machine type communication. At block 604, a shared subscriber identity module (SIM) parameter for the machine type communication is received in response to the connection request. In some cases, the shared SIM parameter is encrypted. In these or other cases, the encrypted shared SIM parameter is decrypted. At block 606, a registration request for a communication channel is transmitted. The registration request includes the shared SIM parameter. At block 608, a registration response is received in response to the registration request. The registration response grants a communication channel. At block 610, a data packet for the machine type communication is transmitted over the communication channel. In some implementations, the data packet for the machine type communication is transmitted over the access network. At block 612, a deregistration indication is transmitted. The deregistration indication releases the shared SIM parameter.

Foregoing references to shared SIM parameters, access manifest parameters, and authentication credentials may include one or more of: a public key; a private key; a certificate; a secret; a signature; a SIM Integrated Circuit Card Identifier (ICCID), which may include an Issuer Identification Number (IIN), Individual Account identification and a check digit; an International Mobile Subscriber Identity (IMSI); an Authentication key ($K_i$) Location area identity information; a Short Message Service Center (SMSC) number; System Architecture Evolution (SAE) Temporary Mobile Subscriber Identity (S-TMSI), which may include a Mobility Management Entity (MME) Temporary Mobile Subscriber Identity (M-TMSI) and an MME Code (MMEC); or other parameters as may be needed in particular circumstances. In an example, shared SIM parameters include only an IMSI and an authentication key.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
   receiving, at a network access node and from a machine type communication (MTC) device, a connection request, wherein the connection request includes an authentication credential for the MTC device, and the connection request includes an indicator indicating that the connection request is for a machine type communication;
   in response to receiving the indicator indicating that the connection request is for the machine type communication, transmitting, from the network access node, an access request to a device management server, wherein the device management server is different than the network access node, and the access request includes the authentication credential for the MTC device;
   in response to transmitting the access request, receiving, at the network access node and from the device management server, a shared International Mobile Subscriber Identity (IMSI) for the machine type communication based on the authentication credential for the MTC device, wherein the shared IMSI is shared among a plurality of MTC devices and selected from a pool of shared IMSIs, and each of the plurality of MTC devices is assigned a different shared IMSI from the pool of shared IMSIs;
   transmitting, to the MTC device, the shared IMSI;
   in response to transmitting the shared IMSI, receiving a registration request from the MTC device, wherein the registration request includes the shared IMSI, and the registration request is different than the connection request; and
   in response to receiving the registration request, registering the MTC device with a cellular network using the shared IMSI.

2. The method of claim 1, further comprising:
   after registering the MTC device, receiving, from the MTC device, a data packet for the machine type communication.

3. The method of claim 2, further comprising:
   receiving, from the MTC device, a deregistration indication; and
   sending, in response to the deregistration indication, a release message that releases the shared IMSI.

4. The method of claim 1, wherein the shared IMSI that is transmitted to the MTC device is encrypted by a public key of the MTC device.

5. The method of claim 1, further comprising:
   establishing, independent of sending the shared IMSI to the MTC device, a MTC data channel for the MTC device using the shared IMSI.

6. The method of claim 1, wherein the MTC device is a Long Term Evolution (LTE) device that is configured for the machine type communication.

7. The method of claim 1, wherein the shared IMSI is stored in the network access node.

8. The method of claim 1, wherein the connection request is transmitted using a low overhead high-layer protocol that is encapsulated in a Long Term Evolution (LTE) access message.

9. The method of claim 1, wherein the connection request is received over a first wireless network and the shared IMSI is used to establish communication for a second wireless network that uses a different radio access technology than the first wireless network.

10. The method of claim 9, wherein the first wireless network uses wireless local area network (WLAN) radio access technology and the second wireless network uses Long Term Evolution (LTE) radio access technology.

11. A network access node, comprising:
    a memory; and
    at least one hardware processor communicatively coupled with the memory and configured to:
      receive, at the network access node and from a Machine Type Communication (MTC) device, a connection request, wherein the connection request includes an authentication credential for the MTC device, and the connection request includes an indicator indicating that the connection request is for a machine type communication;
      in response to receiving the indicator indicating that the connection request is for the machine type communication, transmit, from the network access node, an access request to a device management server, wherein the device management server is different than the network access node, and the access request includes the authentication credential for the MTC device;
      in response to transmitting the access request, receive, at the network access node and from the device management server, a shared International Mobile Subscriber Identity (IMSI) for the machine type communication based on the authentication credential for the MTC device, wherein the shared IMSI identifies the MTC device, the shared IMSI is selected from a pool of shared IMSIs, and the pool of shared IMSIs is shared among a plurality of MTC devices;
      transmit, to the MTC device, the shared IMSI;
      in response to transmitting the shared IMSI, receive a registration request from the MTC device, wherein the registration request includes the shared IMSI, and the registration request is different than the connection request; and
      in response to receiving the registration request, register the MTC device with a cellular network using the shared IMSI.

12. The device of claim 11, wherein the at least one hardware processor is further configured to:
   after registering the MTC device, receive, from the MTC device, a data packet for the machine type communication.

13. The device of claim 12, wherein the at least one hardware processor is further configured to:
   receive, from the MTC device, a deregistration indication; and
   send, in response to the deregistration indication, a release message that releases the shared IMSI.

14. The device of claim 11, wherein the shared IMSI that is transmitted to the MTC device is encrypted by a public key of the MTC device.

15. The device of claim 11, wherein the at least one hardware processor is further configured to:
   establish, independent of sending the shared IMSI to the MTC device, a MTC data channel for the MTC device using the shared IMSI.

16. The device of claim 11, wherein the MTC device is a Long Term Evolution (LTE) device that is configured for the machine type communication.

17. A tangible, non-transitory computer-readable medium containing instructions which, when executed, cause a network access node to perform operations comprising:
   receiving, at the network access node and from a Machine Type Communication (MTC) device, a connection request, wherein the connection request includes an authentication credential for the MTC device, and the connection request includes an indicator indicating that the connection request is for a machine type communication;
   in response to receiving the indicator indicating that the connection request is for the machine type communication, transmitting, from the network access node, an access request to a device management server, wherein the device management server is different than the network access node, and the access request includes the authentication credential for the MTC device;
   in response to transmitting the access request, receiving, at the network access node and from the device management server, a shared International Mobile Subscriber Identity (IMSI) for the machine type communication based on the authentication credential for the MTC device, wherein the shared IMSI identifies the MTC device, the shared IMSI is selected from a pool of shared IMSIs, and the pool of shared IMSIs is shared among a plurality of MTC devices;
   transmitting, to the MTC device, the shared IMSI;
   in response to transmitting the shared IMSI, receiving a registration request from the MTC device, wherein the registration request includes the shared IMSI, and the registration request is different than the connection request; and
   in response to receiving the registration request, registering the MTC device with a cellular network using the shared IMSI.

* * * * *